United States Patent
Fujisawa et al.

(10) Patent No.: US 11,860,402 B2
(45) Date of Patent: Jan. 2, 2024

(54) ILLUMINATION DEVICE

(71) Applicant: Japan Display Inc., Tokyo (JP)

(72) Inventors: Koji Fujisawa, Tokyo (JP); Ken Kagabu, Tokyo (JP); Hiroaki Kijima, Tokyo (JP); Ken Onoda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/858,235

(22) Filed: Jul. 6, 2022

(65) Prior Publication Data

US 2023/0010210 A1    Jan. 12, 2023

(30) Foreign Application Priority Data

Jul. 8, 2021 (JP) ................. 2021-113652

(51) Int. Cl.
*G02B 6/00* (2006.01)
*F21V 8/00* (2006.01)

(52) U.S. Cl.
CPC ......... *G02B 6/0076* (2013.01); *G02B 6/0035* (2013.01); *G02B 6/00* (2013.01); *G02B 6/0016* (2013.01)

(58) Field of Classification Search
CPC .. G02B 6/0016; G02B 6/0035; G02B 6/0068; G02B 6/0076; G02B 6/0078; G02B 6/008; G02B 6/0088; G02B 6/0036; G02B 6/0055; G02B 6/0056; G02B 6/0065

See application file for complete search history.

(56) References Cited

U.S. PATENT DOCUMENTS

| | | | | |
|---|---|---|---|---|
| 5,079,675 A * | 1/1992 | Nakayama | ............. | G09F 13/14 362/613 |
| 10,488,577 B2 * | 11/2019 | Ochi | .................... | G02B 6/0061 |
| 2001/0038532 A1 * | 11/2001 | Harbers | ............... | G02B 6/0038 362/616 |
| 2009/0073721 A1 * | 3/2009 | Kamikatano | .......... | G02B 6/006 264/1.24 |
| 2009/0103006 A1 * | 4/2009 | Cadio | .................. | G02B 6/0076 362/616 |
| 2010/0259485 A1 * | 10/2010 | Chuang | .................. | G02B 6/006 345/173 |
| 2011/0205727 A1 * | 8/2011 | Kim | ..................... | G02B 6/0023 362/84 |
| 2011/0220774 A1 * | 9/2011 | Ziemkowski | ............ | G01D 5/28 250/200 |
| 2012/0002444 A1 * | 1/2012 | Kim | ..................... | G02B 6/0076 362/613 |

(Continued)

FOREIGN PATENT DOCUMENTS

JP    2018-181729 A    11/2018

*Primary Examiner* — Zheng Song
(74) *Attorney, Agent, or Firm* — K&L Gates LLP (57) ABSTRACT

According to one embodiment, an illumination device, in which a plurality of light guides include a plurality of light guide pairs, each of the plurality of light guide pairs includes a first light guide and a second light guide, the plurality of light guide pairs are connected with their long sides opposed to each other, a plurality of laser light source elements include a plurality of first light source elements arranged to be opposed to a first side surface on a short side of the first light guide of the light guide pair, and a plurality of second light source elements arranged to be opposed to a second side surface of the second light guide of the light guide pair.

8 Claims, 6 Drawing Sheets

(56) References Cited

U.S. PATENT DOCUMENTS

| | | | |
|---|---|---|---|
| 2012/0032997 A1* | 2/2012 | Cha | G02B 6/0076 |
| | | | 362/606 |
| 2012/0113155 A1* | 5/2012 | Fang | G02B 6/0055 |
| | | | 362/97.1 |
| 2016/0320550 A1* | 11/2016 | Tsai | G02B 6/0091 |
| 2018/0299729 A1* | 10/2018 | Zha | G02B 6/0031 |
| 2019/0063709 A1* | 2/2019 | Slovacek | F21S 43/245 |
| 2020/0189450 A1* | 6/2020 | Jeon | B60Q 11/007 |
| 2021/0141147 A1* | 5/2021 | Yasunaga | G02B 6/0068 |

* cited by examiner

FIG. 6

ILLUMINATION DEVICE

CROSS-REFERENCE TO RELATED APPLICATIONS

This application is based upon and claims the benefit of priority from Japanese Patent Application No. 2021-113652 filed Jul. 8, 2021, the entire contents of which are incorporated herein by reference.

FIELD

Embodiments described herein relate generally to an illumination device.

BACKGROUND

A display device such as a liquid crystal display device comprises a display panel equipped with pixels and an illumination device such as a backlight or the like that illuminates the display panel. The illumination device comprises a light source element that emits light and a light guide to which light from the light source element is applied. An illumination device comprising a laser light source as the light source element has been developed.

DETAILED DESCRIPTION

In general, according to one embodiment, an illumination device comprises
a plurality of light guides; and
a plurality of laser light source elements, wherein
the plurality of light guides include a plurality of light guide pairs,
each of the plurality of light guide pairs includes a first light guide and a second light guide provided to overlap the first light guide,
the plurality of light guide pairs are connected with their long sides opposed to each other,
the plurality of laser light source elements include a plurality of first light source elements arranged to be opposed to a first side surface on a short side of the first light guide of the light guide pair, and a plurality of second light source elements arranged to be opposed to a second side surface on a side opposite to the first side surface of the second light guide of the light guide pair.

Embodiments described herein aim to provide a large illumination device.

Each of embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

An illumination device and a display device according to one of the embodiments will be described hereinafter with reference to the accompanying drawings.

In the embodiment, a first direction X, a second direction Y, and a third direction Z are orthogonal to each other, but may intersect at an angle other than degrees. A direction toward a tip of an arrow indicating the third direction Z is referred to as an upper or upward direction, and a direction opposite to the direction toward the tip of the arrow indicating the third direction Z is referred to as a lower or downward direction.

In addition, expressions such as "a second member above a first member" and "a second member under a first member" mean that the second member may be in contact with the first member or may be located remote from the first member. In the latter case, a third member may be interposed between the first member and the second member. In contrast, according to "a second member above a first member" and "a second member under a first member", the second member may be in contact with the first member.

In addition, an observation position at which the illumination device is to be observed is assumed to be located on the tip side of the arrow indicating the third direction Z, and viewing from the observation position toward an X-Y plane defined by the first direction X and the second direction Y is referred to as planar view. Viewing a cross-section of the illumination device on an X-Z plane defined by the first direction X and the third direction Z or a Y-Z plane defined by the second direction Y and the third direction Z is referred to as cross-sectional view.

Embodiment

Figure 1:
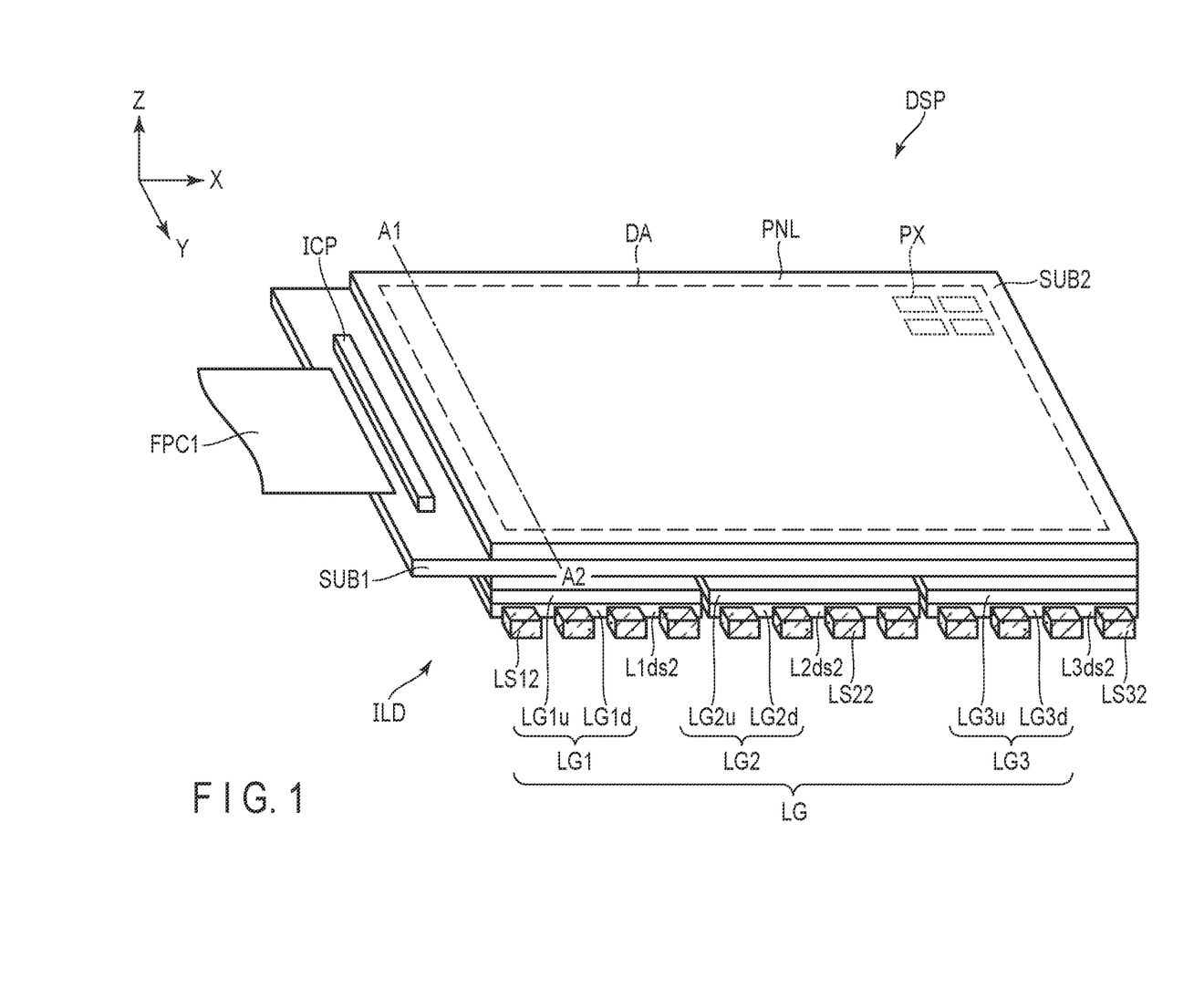
FIG. 1 is a perspective view showing a schematic structure of a display device according to an embodiment.

FIG. 1 is a perspective view showing a schematic structure of a display device according to an embodiment. A display device DSP comprises a display panel PNL, an illumination device ILD that is a backlight, a driver IC chip ICP that drives the display panel PNL, and a flexible circuit board FPC1 that transmits a display panel PNL control signal. For example, the flexible circuit board FPC1 is connected to a control module that controls an operation of the display panel PNL.

The display panel PNL comprises a substrate SUB1 (array substrate), and a substrate SUB2 (counter-substrate) opposed to the substrate SUB1. The display panel PNL includes a display area DA where images are displayed. The display panel PNL includes, for example, a plurality of pixels PX arrayed in a matrix in the display area DA. Although not shown in the figure, the substrates SUB1 and SUB2 of the display panel PNL are bonded together by a sealant. A liquid crystal layer is sealed in the area between the substrates SUB1 and SUB2, which is surrounded by the sealant.

The illumination device ILD comprises a plurality of light source elements and a light guide LG opposed to the substrate SUB1. The light guide LG includes a plurality of light guides and functions as one light guide as a whole. In this embodiment, the light guide LG includes three sets of light guides with two light guides paired, each light guide arranged on upper and lower sides. More specifically, the light guide LG comprises six light guides LG1$u$, LG1$d$, LG2$u$, LG2$d$, LG3$u$, and LG3$d$. The number of light guides is not limited to this, but may be two pairs or four or more pairs. Details of the optical element will be described later.

The light guide LG1$u$ is located above the light guide LG1$d$. In other words, the light guide LG1$u$ is provided between the light guide LG1$d$ and the display panel PNL. The light guide LG2$u$ is provided above the light guide LG2$d$. In other words, the light guide LG2$u$ is provided between the light guide LG2$d$ and the display panel PNL. The light guide LG3$u$ is located above the light guide LG3$d$. In other words, the light guide LG3$u$ is provided between the light guide LG3$d$ and the display panel PNL.

The light guides LG1$u$ and LG1$d$, LG2$u$ and LG2$d$, and LG3$u$ and LG3$d$, overlap in planar view.

In FIG. 1, the light guides LG1$u$ and LG1$d$, LG2$u$ and LG2$d$, and LG3$u$ and LG3$d$ are also referred to as light guides LG1, LG2, and LG3, respectively. The light guides LG1, LG2, and LG3 are also the light guide pairs as described above.

Figure 2:
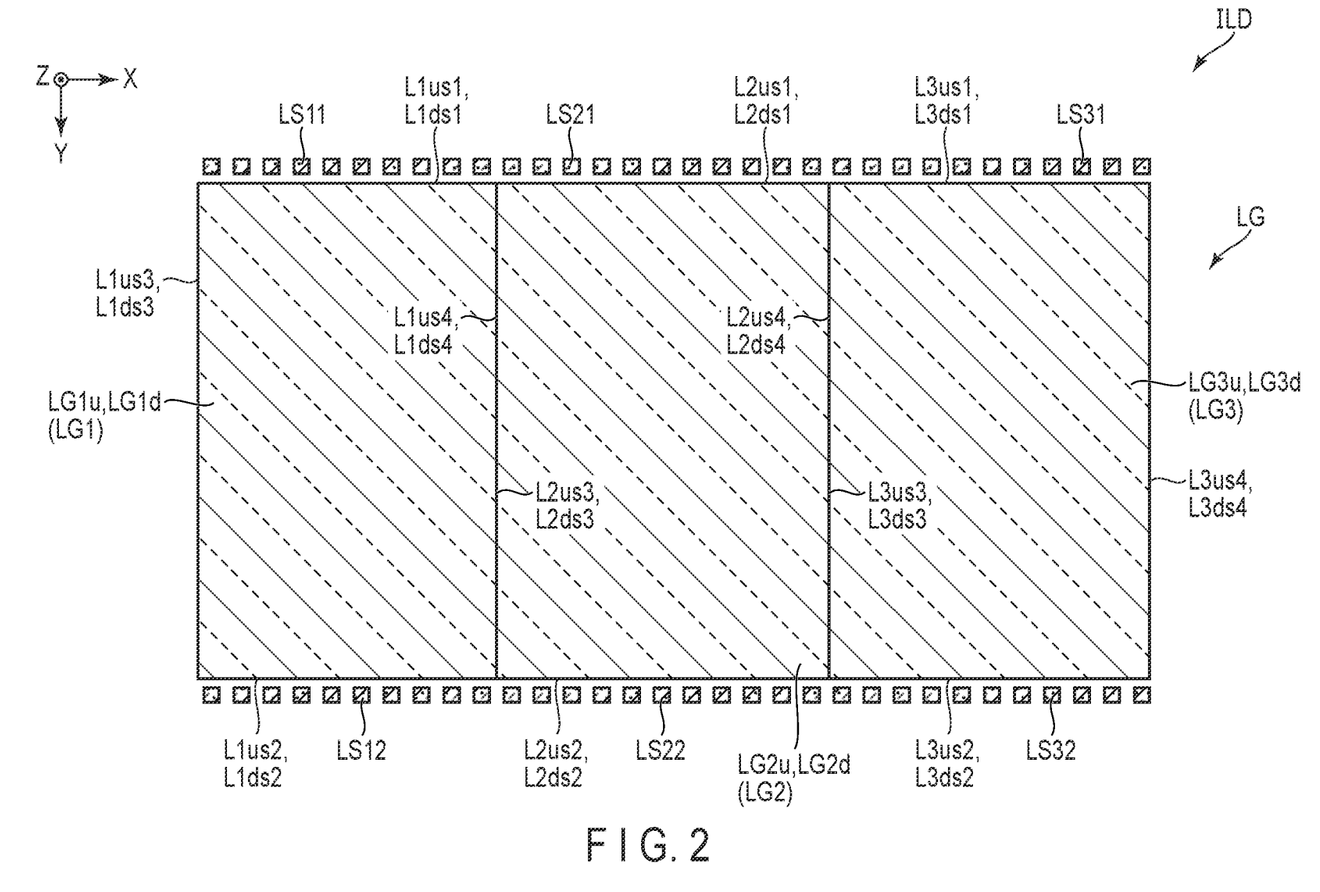
FIG. 2 is a plan view showing a schematic structure of an illumination device.

FIG. 2 is a plan view showing a schematic structure of an illumination device. The light guides LG1, LG2, and LG3 are disposed such that their long sides are opposed to each other. The short sides of the light guides LG1, LG2, and LG3 constitute the long sides of the light guide LG as a whole.

As shown in FIG. 2, the substrates SUB1 and SUB2, and the light guide LG have long sides along the first direction X and short sides along the second direction Y, and their shape in planar view is a rectangle.

Each of the light guides LG1, LG2, and LG3 has short sides along the first direction X and long sides along the second direction Y. A plurality of light source elements are provided on the side surface of the short side.

The light guide LG1$u$ extends along the first direction X and has mutually opposed side surfaces L1$us$1 and L1$us$2. The light guide LG1$d$ extends along the first direction X and has mutually opposed side surfaces L1$ds$1 and L1$ds$2. The light source element LS11 is opposed to the side surface L1$us$1 of the light guide LG1$u$, and the light source element LS12 is opposed to the side surface L1$ds$2 of the light guide LG1$d$.

The light guide LG2$u$ extends along the first direction X and has mutually opposed side surfaces L2$us$1 and L2$us$2. The light guide LG2$d$ extends along the first direction X and has mutually opposed side surfaces L2$ds$1 and L2$ds$2. The light source element LS21 is opposed to the side surface L2$us$1 of the light guide LG2$u$, and the light source element LS22 is opposed to the side surface L2$ds$2 of the light guide LG2$d$.

The light guide LG3$u$ extends along the first direction X and has mutually opposed side surfaces L3$us$1 and L3$us$2. The light guide LG3$d$ extends along the first direction X and has mutually opposed side surfaces L3$ds$1 and L3$ds$2. The light source element LS31 is opposed to the side surface L3$us$1 of the light guide LG3$u$, and the light source element LS32 is opposed to the side surface L3$ds$2 of the light guide LG3$d$.

The side surface L1$us$1, the side surface L1$ds$2, the side surface L2$us$1, the side surface L2$ds$2, the side surface L3$us$1, and the side surface L3$ds$2 are the side surfaces on the short sides of the light guide LG1$u$, the light guide LG1$d$, the light guide LG2$u$, the light guide LG2$d$, the light guide LG3$u$, and the light guide LG3$d$, respectively. In other words, it can be said that the light source elements are disposed opposite to the side surfaces on the short sides of the light guides, respectively.

A side surface L1$us$4 of the light guide LG1$u$ and a side surface L1$ds$4 of the light guide LG1$d$ are provided to be in contact with a side surface L2$us$3 of the light guide LG2$u$ and a side surface L2$ds$3 of the light guide LG2$d$.

A side surface L2$us$4 of the light guide LG2$u$ and a side surface L2$ds$4 of the light guide LG2$d$ are provided to be in contact with a side surface L3$us$3 of the light guide LG3$u$ and a side surface L3$ds$3 of the light guide LG3$d$.

These sides are mirror surfaces, and the side surfaces provided to be in contact with each other are connected in a state where the surfaces are in close contact with each other.

In this embodiment, the above-described side surfaces connected to be in close contact with each other are also referred to as connecting surfaces. The side surfaces L1$us$4 and L2$us$3 are the connecting surfaces of the light guides LG1$u$ and LG2$u$. The side surfaces L1$ds$4 and L2$ds$3 are the connecting surfaces of the light guides LG1$d$ and LG2$d$. The side surfaces L1$us$4, L2$us$3, L1$ds$4, and L2$ds$3 are considered as the connecting surfaces of the light guides LG1 and LG2. The connecting surfaces of the light guides LG2 and LG3 are also considered similarly to the light guides LG1 and LG2.

The side surface L1$us$4, the side surface L1$ds$4, the side surface L2$us$3, the side surface L2$ds$3, the side surface L2$us$4, the side surface L2$ds$4, the side surface L3$us$3, and the side surface L3$ds$3 are the side surfaces on the long sides of the light guide LG1$u$, the light guide LG1$d$, the light guide LG2$u$, the light guide LG2$d$, the light guide LG2$u$, the light guide LG2$d$, the light guide LG3$u$, and the light guide LG3$d$, respectively. In other words, each of the light guides is connected on its side surface of the long side.

The light sources are not disposed on the side surface LG1$us$3, the side surface LG1$ds$3, the side surface L3$us$4, and the side surface L3$ds$4 located on the short side of the light guide LG.

For a large illumination device, for example, a backlight, a large molding machine having, for example, a mold clamping force of 800 tons or more is required in a process of injection molding the light guides.

In contrast, for example, the mold clamping force in the injection molding process may be small for a light guide with a 17-inch backlight. However, a large light guide cannot be manufactured by a molding machine having a small mold clamping force. For this reason, a large illumination device and a large display device can hardly be manufactured.

In this embodiment, a large light guide can be obtained as a whole without using a large molding machine, by arranging a plurality of light guides side by side in a backlight having a size of 18 inches or larger. A large illumination device can be thereby obtained. Furthermore, a large display device comprising such a large illumination device can be obtained.

Figure 3:
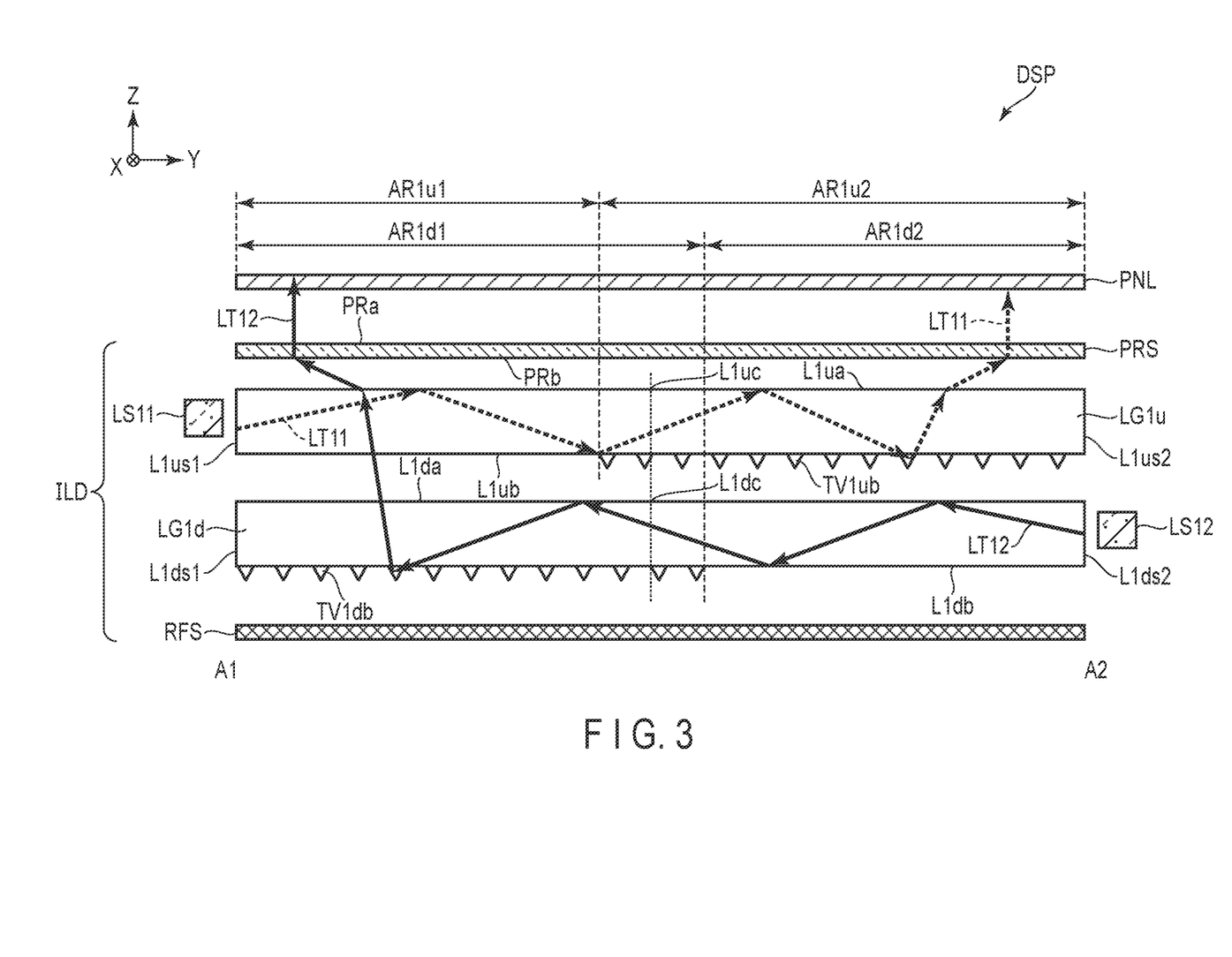
FIG. 3 is a cross-sectional view showing the display device viewed along line A1-A2 in FIG. 1.

FIG. 3 is a cross-sectional view showing the display device viewed along line A1-A2 in FIG. 1. FIG. 3 shows only the light guide LG1 (LG1$u$ and LG1$d$), but the other light guide LG2 (LG2$u$ and LG2$d$), and LG3 (LG3$u$ and LG3$d$) are constituted similarly.

The illumination device ILD of the display device DSP comprises a reflective sheet RFS, the light guide LG1$d$, the light guide LG1$u$, and a prism sheet PRS. These are arranged in this order along the third direction Z.

The light guide LG1$d$ has side surfaces L1$ds$1 and L1$ds$2, and main surfaces L1$da$ and L1$db$. As described above, the light source element LS12 is provided to be opposed to the side surface L1$ds$2 and is not provided on the side surface L1$ds$1. The main surface L1$da$ is opposed to a main surface LG1$ub$ of the light guide LG1$u$. The main surface L1$db$ is opposed to the reflective sheet RFS.

The light guide LG1$u$ has side surfaces L1$us$1 and L1$us$2, and main surfaces L1$ua$ and L1$ub$. The main surface L1$ub$ is provided on a side opposite to the main surface L1$da$. As described above, the light source element LS11 is provided to be opposed to the side surface L1$us$1 and is not provided on the side surface L1$us$2. The main surface L1$ua$ is opposed to a main surface PRb of the prism sheet PRS. The main surface L1$ub$ is opposed to a main surface LG1$da$ of the light guide LG1$d$.

An area far from the side surface L1$ds$2 and close to the side surface L1$ds$1, i.e., an area far from the light source element LS12, in the area of the light guide LG1$d$, is referred to as AR1$d$1. The area AR1$d$1 includes a central part L1$dc$ of the light guide LG1$d$. An area which is not the area AR1$d$1, i.e., an area close to the light source element LS12, in the area of the light guide LG1$d$, is referred to as AR1$d$2. The area AR1$d$2 does not include the central part L1$dc$ of the light guide LG1$d$.

A plurality of protruding portions TV1$db$ extending in a direction parallel to the first direction X and aligned in a direction parallel to the second direction Y are provided on the main surface L1$db$ of the area AR1$d$1. Each of the plurality of protruding portions TV1$db$ is shaped in a triangular prism and its cross-section in the Y-Z plane is formed to have a vertical angle of 130 degrees. Light LT12 emitted from the light source element LS12 is reflected at an angle of reflection of 15 degrees by a protrusion having a vertical angle of 130 degrees to be led toward the front side.

No protruding portions TV1$db$ are provided in the area AR1$d$2.

An area far from the side surface L1$us$1 and close to the side surface L1$ds$2, i.e., an area far from the light source element LS11, in the area of the light guide LG1$u$, is referred to as AR1$u$2. The area AR1$u$2 includes a central part L1$uc$ of the light guide LG1$u$. An area which is not the area AR1$u$2, i.e., an area close to the light source element LS11, in the area of the light guide LG1$u$, is referred to as AR1$u$1. The area AR1$u$1 includes a central part L1$uc$ of the light guide LG1$u$.

A plurality of protruding portions TV1$ub$ extending in a direction parallel to the first direction X and aligned in a direction parallel to the second direction Y are provided in the area AR1$u$2. Each of the plurality of protruding portions TV1$ub$ is shaped in a triangular prism and its cross-section in the Y-Z plane is formed to have a vertical angle of 130 degrees. Light LT11 emitted from the light source element LS11 is reflected at an angle of reflection of 15 degrees by a protrusion having a vertical angle of 130 degrees to be led toward the front side.

No protruding portions TV1$ub$ are provided in the area AR1$u$1.

The prism sheet PRS has main surfaces PRa and PRb. The main surface PRa is opposed to the display panel PNL. The main surface PRb is opposed to the main surface L1$ua$ of the light guide LG1$u$. Although not shown in the figure, a plurality of protruding portions are also provided on the prism sheet PRS.

For example, laser light source elements such as semiconductor laser elements emitting polarized laser light can be used as the light source elements LS11 and LS12. The laser light travels straight without expanding.

Each of the light source elements LS11, LS12, LS21, LS22, LS31, and LS32 may comprise a plurality of light emitting elements that emit light of different colors. For example, when a light source element comprises three light emitting elements emitting red light, green light, and blue light, light of a mixed color (for example, white) of these colors can be obtained.

The light LT12 (solid line) emitted from the light source element LS12 is made incident from the side surface L1$ds$2, and propagates while being reflected inside the light guide LG1$d$ along a direction opposite to the second direction Y. When the light LT12 reaches the area AR1$d$1, its angle of reflection is changed by the protruding portions TV1$db$ and the light is emitted toward the light guide LG1$u$.

The light LT12 made incident on the light guide LG1$u$ passes through the area AR1$u$1 where the protruding portions TV1$ub$ are not provided, and is emitted toward the prism sheet PRS.

The angle of reflection of the light LT12 made incident on the prism sheet PRS is further changed by the protruding portions of the prism sheet PRS, and the light is emitted in a direction parallel to the third direction Z, i.e., a direction perpendicular to the main surface PRa of the prism sheet PRS. The emitted light LT12 is made incident on the display panel PNL.

The light LT11 (dotted line) emitted from the light source element LS11 is made incident from the side surface L1$us$1, and propagates while being reflected inside the light guide LG1$u$ along the second direction Y. When the light LT11 reaches the area AR1$u$2, its angle of reflection is changed by the protruding portions TV1$ub$ and the light is emitted toward the prism sheet PRS.

The angle of reflection of the light LT11 made incident on the prism sheet PRS is further changed by the protruding portions of the prism sheet PRS, and the light is emitted in a direction parallel to the third direction Z, i.e., a direction perpendicular to the main surface PRa of the prism sheet PRS. The emitted light LT11 is made incident on the display panel PNL.

The light LT11 and the light LT12 are linearly polarized light. For this reason, only one polarizer may be provided in the display panel PNL that is the liquid crystal display panel. The display of the display panel PNL can be made brighter as compared with a case of providing two polarizers.

The areas AR1$u$2 and AR1$d$1 overlap in planar view. The overlapping areas overlap the central part L1$uc$ of the light guide LG1$u$ and the central part L1$dc$ of the light guide LG1$d$ in planar view. The areas AR1$u$1 and AR1$d$2 do not overlap in planar view.

A connected part of the light guides in FIG. 2 will be described.

As described above, the light source elements of this embodiment emit laser light. When the laser light source is used as the light source element, the linearity is higher as compared with light source element of light emitting diode (LED) or the like. For this reason, there is an advantage that at a connecting part of the adjacent light guides, for example, a connecting part of the light guides LG1 and LG2, more specifically, the side surfaces L1$us$4 and L2$us$3 and the side surfaces L1$ds$3 and L2$ds$3, the light reflection from the side surfaces is small and the above connecting part is inconspicuous.

Figure 4:
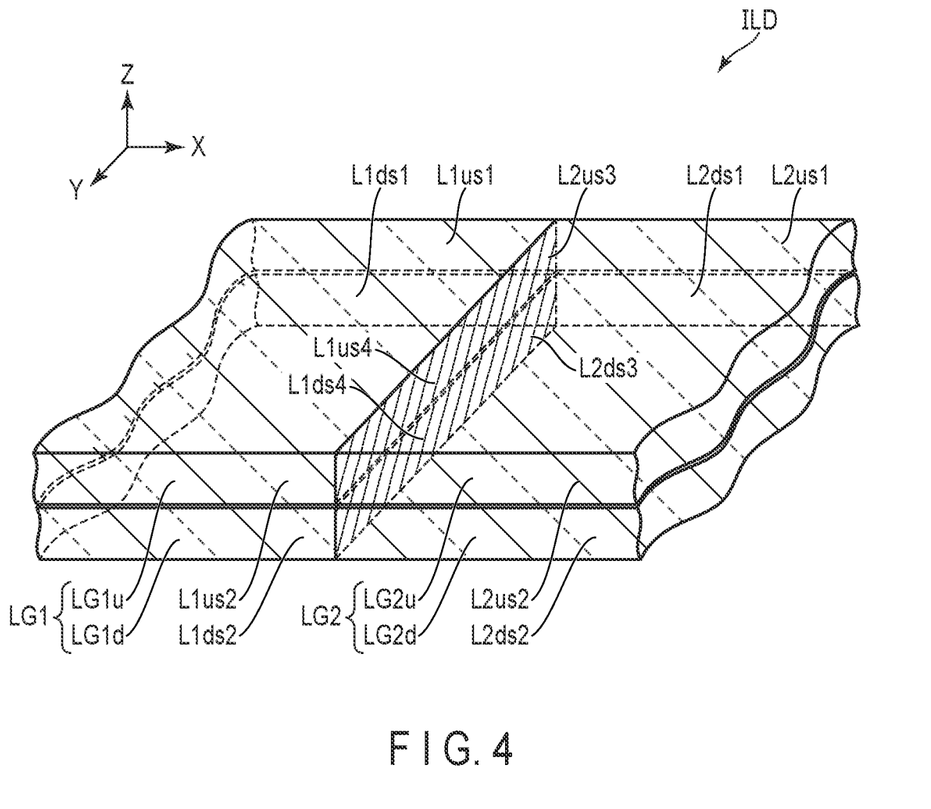
FIG. 4 is a perspective view showing an example of the connecting part of the light guides.

FIG. 4 is a perspective view showing an example of the connecting part of the light guides. The side surfaces L1us4 and L2us3, and the side surfaces L1ds4 and L2ds3 are brought into close contact with each other to constitute the connecting surface of the light guides LG1u and LG2u, and the connecting surface of the light guides LG1d and LG2d. As described above, the connecting surfaces are mirror surfaces.

The side surfaces L1us4 and L2us3, and the side surfaces L1ds4 and L2ds3 overlap in planar view. These side surfaces also constitute the connecting surface of the light guides LG1 and LG2 that are a light guide pair.

According to tis embodiment, a large illumination device with small reflection from the light guide side surfaces and the inconspicuous connecting part can be obtained. In addition, a large display device comprising such an illumination device can be provided.

Figure 5A:
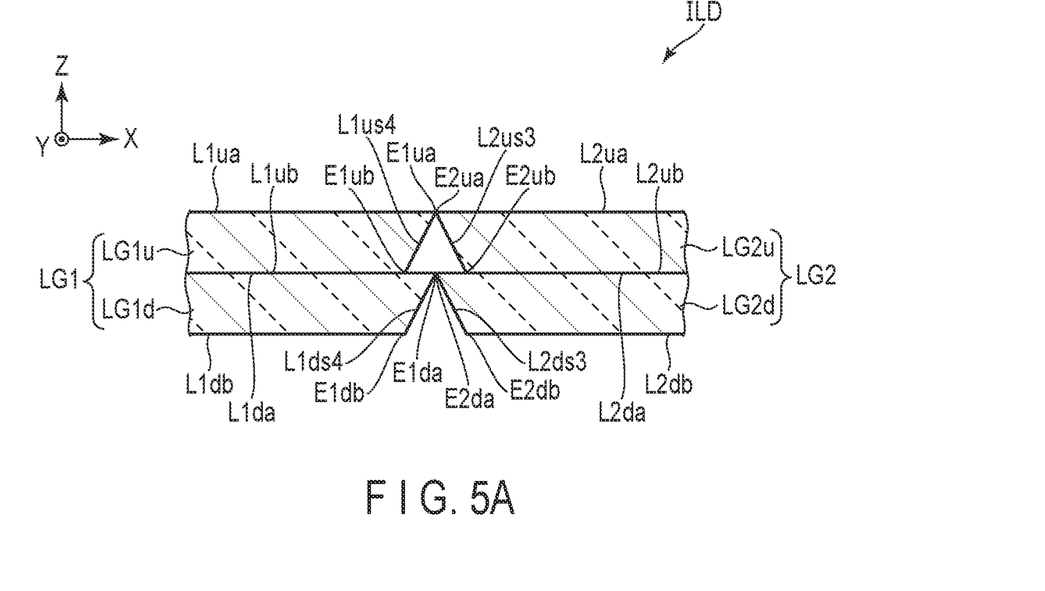
FIG. 5A is a cross-sectional view showing another example of the connecting part of the light guides.
Figure 5B:
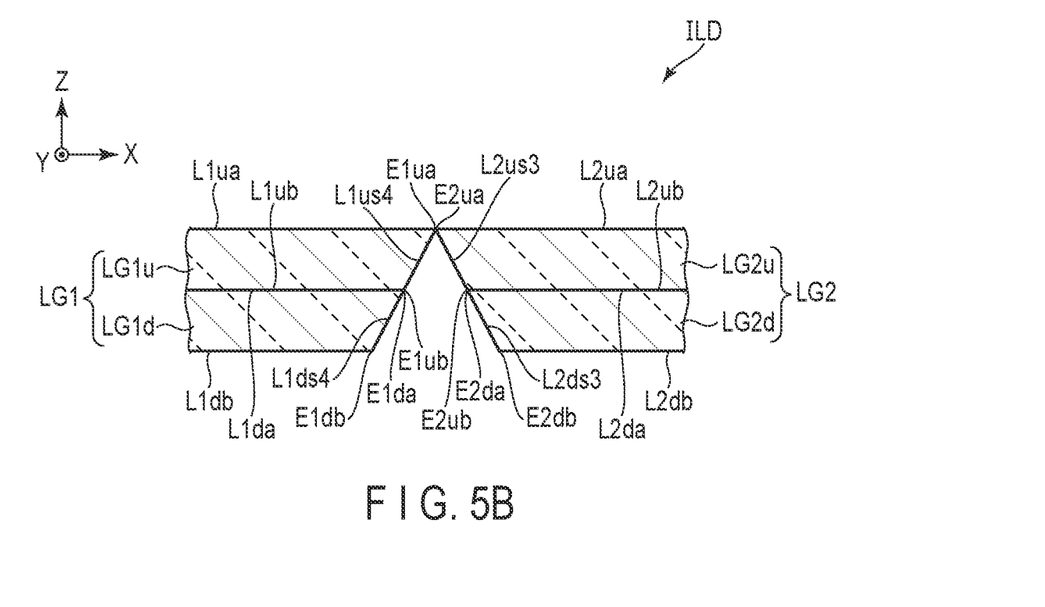
FIG. 5B is a cross-sectional view showing another example of the connecting part of the light guides.

FIG. 5A and FIG. 5B are cross-sectional views showing the other examples of the connecting part of the light guides. The examples shown in FIG. 5A and FIG. 5B are different from the example shown in FIG. 4 in that the light guides are not in close contact with each other at the connecting part.

FIG. 5A is a cross-sectional view showing a vicinity of the connecting part between the light guides LG1 and LG2. The light guide LG1u includes end portions E1ua and E1ub on the respective main surfaces L1ua and L1ub. The light guide LG2u includes end portions E2ua and E2ub on the respective main surfaces L2ua and L2ub.

The end portions E1ua and E2ua are adjacent to each other. In contrast, the end portions E1ub and E2ub are arranged to be close and opposed to each other, but are not in contact with each other.

Alternatively, the end portions E1ua and E2ua are arranged to be close to each other, but may not be in contact with each other. A distance between the end portions E1ua and E2ua is longer than a distance between the end portions E1ub and E2ub. The cross-section in the X-Z plane close to the connecting part of the light guides LG1u and LG2u has a wedge shape. The side surface L1us4 of the light guide LG1u is not in close contact with the side surface L2us3 of the light guide LG2u.

Similarly to the light guides LG1u and LG2u, the light guide LG1d includes end portions E1da and E1db on the respective main surfaces L1da and L1db. The light guide LG2d includes end portions E2da and E2db on the respective main surfaces L2da and L2db.

The end portions E1da and E2da are adjacent to each other. In contrast, the end portions E1db and E2db are arranged to be close and opposed to each other, but are not in contact with each other.

Alternatively, the end portions E1da and E2da are arranged to be close to each other, but may not be in contact with each other. A distance between the end portions E1da and E2da is longer than a distance between the end portions E1db and E2db.

The cross-section in the X-Z plane close to the connecting part of the light guides LG1d and LG2d has a wedge shape. The side surface L1ds4 of the light guide LG1d is not in close contact with the side surface L2ds3 of the light guide LG2d.

The configuration of arranging the light guides LG1 and LG2 as shown in FIG. 5A has an advantage that the connecting part is further inconspicuous as compared with FIG. 4.

FIG. 5B is a cross-sectional view showing a vicinity of the connecting part between the light guides LG1 and LG2. The example shown in FIG. 5B is different from the example shown in FIG. 5A in that the cross-section of the connecting part of the light guide pair has a wedge shape.

In FIG. 5B, the distance between the end portions E1ua and E2ua, the distance between the end portions E1ub and E2ub, the distance between the end portions E1da and E2da, and the distance between the end portions E1db and E2db are longer in this order.

Each of the light guide LG1 including the light guides LG1u and light guide LG1d, and the light guide LG2 including the light guides LG2u and LG2d is also the light guide pair as described above. The cross-section in the X-Z plane close to the connecting part of the light guides LG1 and LG2 has a wedge shape.

In FIG. 5B, the illumination device comprising an inconspicuous connecting part can also be obtained.

Figure 6:
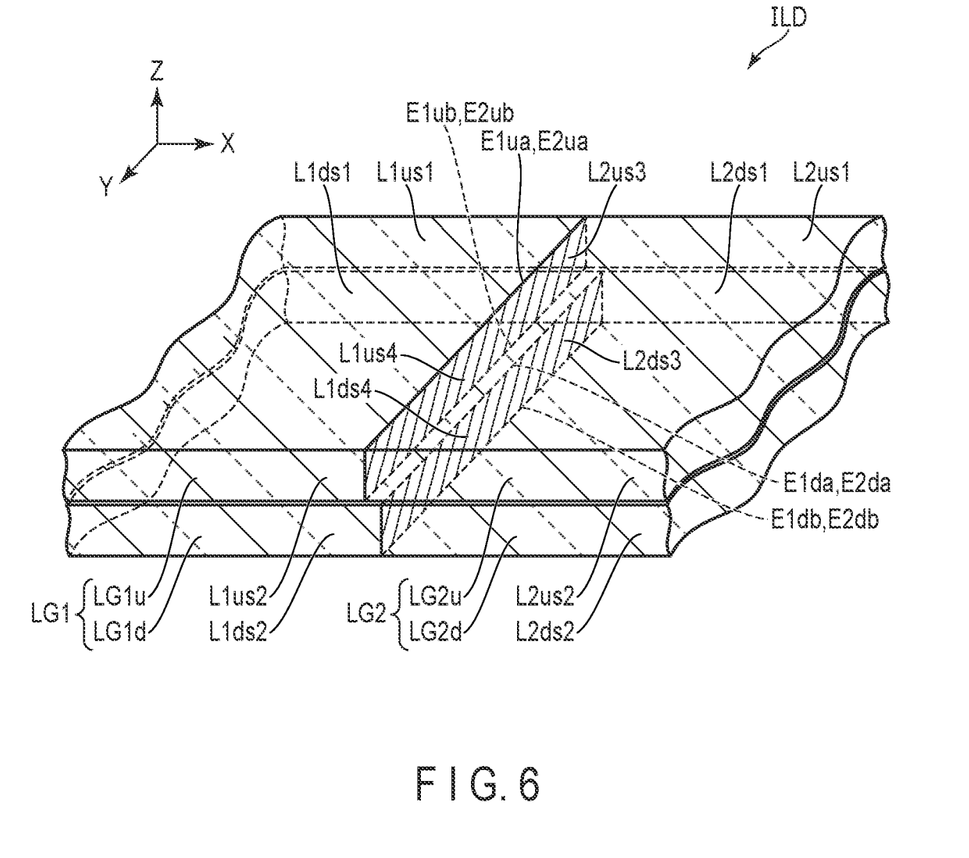
FIG. 6 is a cross-sectional view showing another example of the connecting part of the light guides.

FIG. 6 is a cross-sectional view showing the other example of the connecting part of the light guides. The example shown in FIG. 6 is different from the example shown in FIG. 4 in that the connection surfaces of the upper and lower light guides are separated from each other.

In the example shown in FIG. 6, the side surfaces L1us4 and L2us3, and the side surfaces L1ds4 and L2ds3 do not overlap in the third direction Z. The end portions E1ub and E2ub and the end portions E1da and E2da are located in the same X-Y plane and are separated at an interval.

As shown in FIG. 6, when the connecting surface of the upper light guides LG1u and LG2u, and the connecting surface of the lower light guides LG1d and LG2d are separated, the connecting surfaces are further inconspicuous. The illumination device comprising a further inconspicuous connecting part can be thereby obtained.

In this disclosure, of the light guide pair in which two light guides are paired, the light guide arranged on the lower side is also referred to as a first light guide, and the light guide arranged on the upper side is also referred to as a second light guide.

Long sides and short sides of each of the light guides included in the light guide pair are also referred to as long sides and short sides of the light guide pair.

In FIG. 3, the central part L1dc of the light guide LG1d is referred to as a first central part, and the central part L1uc of the light guide LG1u is referred to as a second central part. The areas AR1d1, AR1d2, AR1u1, and AR1u2 are also referred to as a first area, a second area, a third area, and a fourth area.

The protruding portions TV1db and TV1ub are also referred to as first protruding portions and second protruding portions.

In FIG. 5A and FIG. 5B, the main surfaces L1ua and L2ua are referred to as first main surfaces. The main surfaces L1ub and L2ub are referred to as second main surfaces. The main surfaces L1da and L2da are referred to as third main surfaces. The main surfaces L1db and L2db are referred to as fourth main surfaces.

The end portions E1ua and E2ua are referred to as first end portions, and the end portions E1ub and E2ub are referred to as second end portions. The end portions E1da and E2da are referred to as third end portions, and the end portions E1db and E2db are referred to as fourth end portions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
   a plurality of light guides; and
   a plurality of laser light source elements, wherein
   the plurality of light guides include a plurality of light guide pairs,
   each of the plurality of light guide pairs includes a first light guide and a second light guide provided to overlap the first light guide,
   the plurality of light guide pairs are connected with their long sides opposed to each other,
   the plurality of laser light source elements include a plurality of first light source elements arranged to be opposed to a first side surface on a short side of the first light guide of the light guide pair, and a plurality of second light source elements arranged to be opposed to a second side surface on a side opposite to the first side surface of the second light guide of the light guide pair,
   the plurality of light guide pairs include a first light guide pair and a second light guide pair adjacent to each other,
   each of the second light guide of the first light guide pair, and the second light guide of the second light guide pair has a first main surface and a second main surface on a side opposite to the first main surface,
   a first end portion of the first main surface of the second light guide of the first light guide pair is in contact with a first end portion of the first main surface of the second light guide of the second light guide pair, and
   a second end portion of the second main surface of the second light guide of the first light guide pair is separated from a second end portion of the second main surface of the second light guide of the second light guide pair.

2. The illumination device according to claim 1, wherein
   the first light guide includes a first area including a first central part and a second area not including the first central part,
   the second light guide includes a third area not including a second central part and a fourth area including the second central part,
   the device further includes a plurality of first protruding portions provided in the first area and a plurality of second protruding portions provided in the fourth area,
   the first area is farther from the first light source element than the second area, and
   the fourth area is farther from the second light source element than the third area.

3. The illumination device according to claim 2, wherein a cross-section of each of the plurality of first protruding portions and each of the plurality of second protruding portions is shaped in an isosceles triangle.

4. The illumination device according to claim 3, wherein a cross-section of each of the plurality of first protruding portions and each of the plurality of second protruding portions is shaped in a regular triangle.

5. The illumination device according to claim 2, wherein the second area and the third area do not overlap in planar view.

6. The illumination device according to claim 1, wherein a connecting surface of the first light guide of the first light guide pair and the first light guide of the second light guide pair overlaps a connecting surface of the second light guide of the first light guide pair and the second light guide of the second light guide pair, in planar view.

7. The illumination device according to claim 1, wherein a connecting surface of the first light guide of the first light guide pair and the first light guide of the second light guide pair is separated from a connecting surface of the second light guide of the first light guide pair and the second light guide of the second light guide pair.

8. The illumination device according to claim 1, wherein each of the first light guide of the first light guide pair, and the first light guide of the second light guide pair has a third main surface and a fourth main surface on a side opposite to the third main surface,
   a third end portion of the third main surface of the first light guide of the first light guide pair is in contact with a third end portion of the third main surface of the first light guide of the second light guide pair, and
   a fourth end portion of the fourth main surface of the first light guide of the first light guide pair is separated from a fourth end portion of the fourth main surface of the first light guide of the second light guide pair.

* * * * *